United States Patent
Aoyama et al.

(10) Patent No.: US 9,450,905 B2
(45) Date of Patent: Sep. 20, 2016

(54) INFORMATION SHARING SYSTEM, INFORMATION SHARING METHOD, AND INFORMATION STORAGE MEDIUM

(71) Applicant: Cybozu, Inc., Bunkyo-ku, Tokyo (JP)

(72) Inventors: Ken Aoyama, Tokyo (JP); Yuki Okada, Nishitokyo (JP); Teppei Sato, Tokyo (JP); Masanori Matsumoto, Tokyo (JP)

(73) Assignee: Cybozu, Inc., Tokyo (JP)

( * ) Notice: Subject to any disclaimer, the term of this patent is extended or adjusted under 35 U.S.C. 154(b) by 225 days.

(21) Appl. No.: 14/201,941

(22) Filed: Mar. 10, 2014

(65) Prior Publication Data

US 2014/0298196 A1   Oct. 2, 2014

(30) Foreign Application Priority Data

Mar. 8, 2013 (JP) ................. 2013-047382

(51) Int. Cl.
G06F 3/00 (2006.01)
H04L 12/58 (2006.01)
G06F 3/01 (2006.01)

(52) U.S. Cl.
CPC .................... H04L 51/24 (2013.01)

(58) Field of Classification Search
None
See application file for complete search history.

(56) References Cited

U.S. PATENT DOCUMENTS

| | | | | |
|---|---|---|---|---|
| 8,924,493 B1* | 12/2014 | Yeskel | ................ | G06F 9/542 709/206 |
| 2006/0195536 A1 | 8/2006 | Tsuboi et al. | | |
| 2010/0228836 A1* | 9/2010 | Lehtovirta | ............. | H04L 12/00 709/220 |
| 2013/0145269 A1* | 6/2013 | Latulipe | ................. | G06F 3/048 715/720 |
| 2013/0262574 A1* | 10/2013 | Cohen | ................ | G06F 17/2765 709/204 |
| 2014/0033015 A1* | 1/2014 | Shaver | ................. | G06F 17/241 715/233 |
| 2014/0172987 A1* | 6/2014 | Luu | ........................ | H04L 51/16 709/206 |
| 2014/0188997 A1* | 7/2014 | Schneiderman | ....... | H04L 51/32 709/204 |
| 2014/0189540 A1* | 7/2014 | Pead | ..................... | H04L 65/403 715/753 |
| 2014/0237389 A1* | 8/2014 | Ryall | .................... | H04L 65/403 715/753 |

FOREIGN PATENT DOCUMENTS

JP            2006-236264 A         9/2006

* cited by examiner

*Primary Examiner* — Toan Vu
(74) *Attorney, Agent, or Firm* — Hubbs, Enatsky & Inoue PLLC

(57) ABSTRACT

A generating unit of an information sharing system generates, in a case where one of a plurality of users enters a comment, notice information for notifying the other users of a notification of the comment. When the user who enters the comment specifies a destination of the comment, a destination associating unit associates destination identifying information for identifying the specified destination with the notice information. A display information generating unit generates display information for displaying, on a display unit of the user, a screen on which the notification of the comment that specifies the user as the destination is distinguished from the notification of the comment that does not specify the user as the destination, based on the notice information and the destination identifying information.

15 Claims, 13 Drawing Sheets

| COMMENT GROUP ID | APPLICATION | COMMENT ID | SENDER | COMMENT |
|---|---|---|---|---|
| 001 | A | 1 | user A | ······· |
|  |  | 2 | user B | ······· |
|  |  | 3 | user E | ······· |
| 002 | B | 1 | user A | ······· |
| 003 | B | 1 | user A | ······· |
|  |  | 2 | user B | ······· |
| ⋮ | ⋮ | ⋮ | ⋮ | ⋮ |

FIG.10

| COMMENT GROUP ID | APPLICATION | COMMENT ID | SENDER | RECIPIENT | DESTINATION IDENTIFICATION FLAG | PART OF COMMENT | GENERATION DATE |
|---|---|---|---|---|---|---|---|
| 001 | A | 1 | user A | user B | 0 | ...... | ...... |
| 001 | A | 1 | user A | user D | 1 | ...... | ...... |
| 001 | A | 1 | user A | user E | 0 | ...... | ...... |
| ...... | ...... | ...... | ...... | ...... | ...... | ...... | ...... |

INFORMATION SHARING SYSTEM, INFORMATION SHARING METHOD, AND INFORMATION STORAGE MEDIUM

CROSS REFERENCE TO RELATED APPLICATIONS

The present application claims priority from Japanese application JP 2013-047382 filed on Mar. 8, 2013, the content of which is hereby incorporated by reference into this application.

TECHNICAL FIELD

The present invention relates to an information sharing system, an information sharing method, and an information storage medium.

BACKGROUND ART

In recent years, there has been known an information sharing system in which a plurality of users share information. For example, Patent Literature 1 describes a technology to control anonymity of comments of users in a bulletin board system for sharing comments entered by the users.

CITATION LIST

Patent Literature

Patent Literature 1: JP 2006-236264 A

SUMMARY OF THE INVENTION

However, the technology described in Patent Literature 1 requires a lot of trouble for a user to find out a necessary comment for the user from among many comments on the bulletin board system, and sometimes some of the comments are overlooked. That is, in the comments entered in the bulletin board, some comments are directed to the user and others are not, and thus the user needs to find out comments directed to the user from among many comments each time.

One or more embodiments of the present invention have been conceived in view of the above, and an object thereof is to provide an information sharing system, an information sharing method, and an information storage medium for allowing a user to easily find a comment directed to the user.

In order to solve the above described problems, an information sharing system for sharing information among a plurality of users according to the present invention includes a generating unit configured to, in a case where one of the plurality of users enters a comment, generate notice information for informing other users of a notification of the comment, a destination associating unit configured to, in a case where the user who has entered the comment specifies a destination of the comment, associate destination identifying information for identifying the specified destination with the notice information, and a display information generating unit configured to generate display information for displaying a screen based on the notice information and the destination identifying information, on a display unit of a user, the screen distinguishing a notification of a comment that specifies the user as the destination from a notification of a comment that does not specify the user as the destination.

An information sharing method for sharing information among a plurality of users according to the present invention includes generating, in a case where one of the plurality of users enters a comment, notice information for informing other users of a notification of the comment, associating, in a case where the user who has entered the comment specifies a destination of the comment, destination identifying information for identifying the specified destination with the notice information, and generating display information for displaying a screen based on the notice information and the destination identifying information, on a display unit of a user, the screen distinguishing a notification of a comment that specifies the user as the destination from a notification of a comment that does not specify the user as the destination.

A program according to the present invention causes a computer, which shares information among a plurality of users, to perform the functions of generating, in a case where one of the plurality of users enters a comment, notice information for informing other users of a notification of the comment, associating, in a case where the user who has entered the comment specifies a destination of the comment, destination identifying information for identifying the specified destination with the notice information, and generating display information for displaying a screen based on the notice information and the destination identifying information, on a display unit of a user, the screen distinguishing a notification of a comment that specifies the user as the destination from a notification of a comment that does not specify the user as the destination.

An information storage medium according to the present invention is a computer-readable non-transitory information storage medium storing the program.

According to the present invention, a user can easily find a comment directed to the user.

In an embodiment of the present invention, the display information generating unit includes a unit configured to generate display information for displaying, on a display unit of a user, a screen that includes both of a notification of a comment that specifies the user as a destination and a notification of a comment that does not specify the user as a destination. When the user performs a predetermine operation, the display information generating unit generates the display information for displaying a screen on which the notification of the comment that does not specify the user as the destination is restricted from being displayed.

In an embodiment of the present invention, the information sharing system allows the users to share a comment group that includes comments posted by the users. The notice information is information for informing the users that a comment is added to the comment group. In a case where a user selects, on a display unit corresponding to the user, a notification of a comment group including a comment that specifies the user as a destination, the display information generating unit generates display information for displaying a screen distinguishing, in the comment group, a comment that specifies the user as the destination from a comment that does not specify the user as the destination.

In an embodiment of the present invention, in a case where the user who enters the comment inputs a particular symbol in the comment, the destination associating unit obtains the destination identifying information based on content input in a portion of the comment corresponding to the particular symbol.

In an embodiment of the present invention, the information sharing system further includes a unit configured to, in a case where the user who enters the comment inputs the particular symbol, generate information for displaying a destination candidate of the comment on a display unit corresponding to the user, and a unit configured to generate information for setting information, which is for identifying the destination candidate selected by the user who enters the comment, on the portion corresponding to the particular symbol.

In an embodiment of the present invention, the information sharing system further includes a unit configured to, in a case where the user who enters the comment inputs the particular symbol in the comment, specify a portion of the comment in which the user specifies a destination of the comment based on a position of the particular symbol and a unit configured to associate portion identifying information for identifying the specified portion of the comment with the destination identifying information. In a case where a notification of a comment that specifies a user as a destination is displayed on a display unit corresponding to the user, the display information generating unit generates display information for displaying a screen that includes, in the notification, the specified portion of the comment, based on the portion identifying information.

In an embodiment of the present invention, a user group to which a notification of a comment is informed is set in advance in the information sharing system. In a case where a destination specified in the posted comment includes a user who does not belong to the user group set in advance, the generating unit generates the notice information for informing the user who does not belong to the user group of the notification.

In an embodiment of the present invention, the information sharing system is connected via a network to an external system for sharing information among a plurality of users The information sharing system further includes a unit configured to obtain content stored in a unit that associates and stores respective users of the information sharing system and respective users of the external system, and a unit configured to obtain, from the external system, information for informing the users of the information sharing system of a comment posted in the external system and information for identifying a user, of the external system, who is specified as a destination of the comment. The display information generating unit generates display information for displaying, on a display unit corresponding to a user of the information sharing system, a screen distinguishing a notification of a comment that is posted in the external system and specifies a user of the external system associated with the user of the information sharing system as a destination from a notification of a comment that is posted in the external system and does not specify a user of the external system associated with the user of the information sharing system as a destination.

BRIEF DESCRIPTION OF THE DRAWINGS

In the accompanying drawings:

FIG. 10 is a diagram illustrating an example of storing data of notice information;

DESCRIPTION OF THE INVENTION

[1. Overall Configuration of Information Sharing System]

Figure 1:
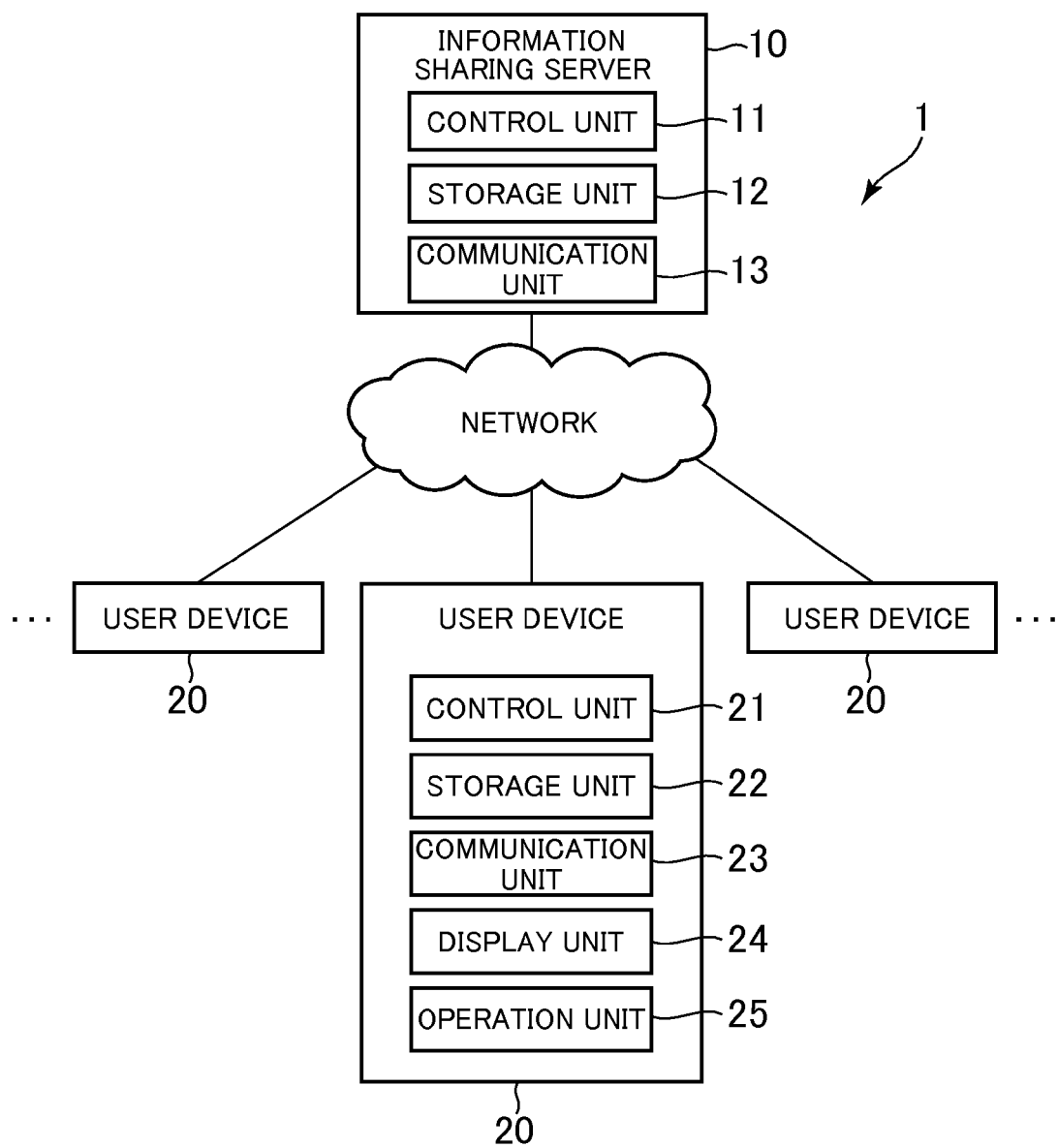
FIG. 1 is a diagram illustrating an example of a network configuration of an information sharing system according to an embodiment of the present invention.

An embodiment of the present invention will be described below in detail with reference to the accompanying drawings. FIG. 1 illustrates an example of a network configuration of an information sharing system according to an embodiment of the present invention. As shown in FIG. 1, the information sharing system 1 includes an information sharing server 10 connectable to a plurality of user devices 20 via a network.

The information sharing server 10 includes, for example, a control unit 11 including a CPU, a storage unit 12 for storing various programs and various types of data for executing the programs, and a communication unit 13 including a network card used for communicating other devices by wire or wireless.

The information sharing server 10 provides a variety of services to each of the users who operate the user devices 20 by having the control unit 11 execute the programs stored in the storage unit 12. For example, the information sharing server 10 provides an information sharing service for allowing the users who operate the user devices 20 to share information on the basis of HTTP (Hypertext Transfer Protocol).

For simplicity, the following discusses a case where the storage unit 12 stores information necessary for providing the information sharing service, although such information may be stored in a database server connected to the information sharing server 10. In this embodiment, the information sharing system 1 according to the present invention comprises a single information sharing server 10. However, the information sharing system 1 may comprise a plurality of information sharing servers 10 in order to share various types of processing.

The user device 20 includes, for example, a control unit 21 including a CPU, a storage unit 22 for storing various programs and various types of data for executing the programs, a communication unit 23 including a network card used for communicating other devices by wire or wireless, a display unit 24 including a liquid crystal display, and an operation unit 25 including a mouse or a keyboard.

A user starts a web browser by operating the operation unit 25, and accesses the information sharing server 10 through the communication unit 23, thereby making use of the information sharing service provided by the information sharing server 10.

Various types of computer hardware are applicable to hardware of the information sharing server 10 and the user device 20. For example, the information sharing server 10 and the user device 20 may each include a reading device of the information storage medium. Further, in this embodiment, programs and data will be described as being stored in the storage unit 12 or the storage unit 22, although the programs and data may be obtained from an external storage medium, such as an optical disc or a flash memory, or obtained from an external computer via a network.

[2. Information Sharing Service Provided by Information Sharing System]

Figure 2:
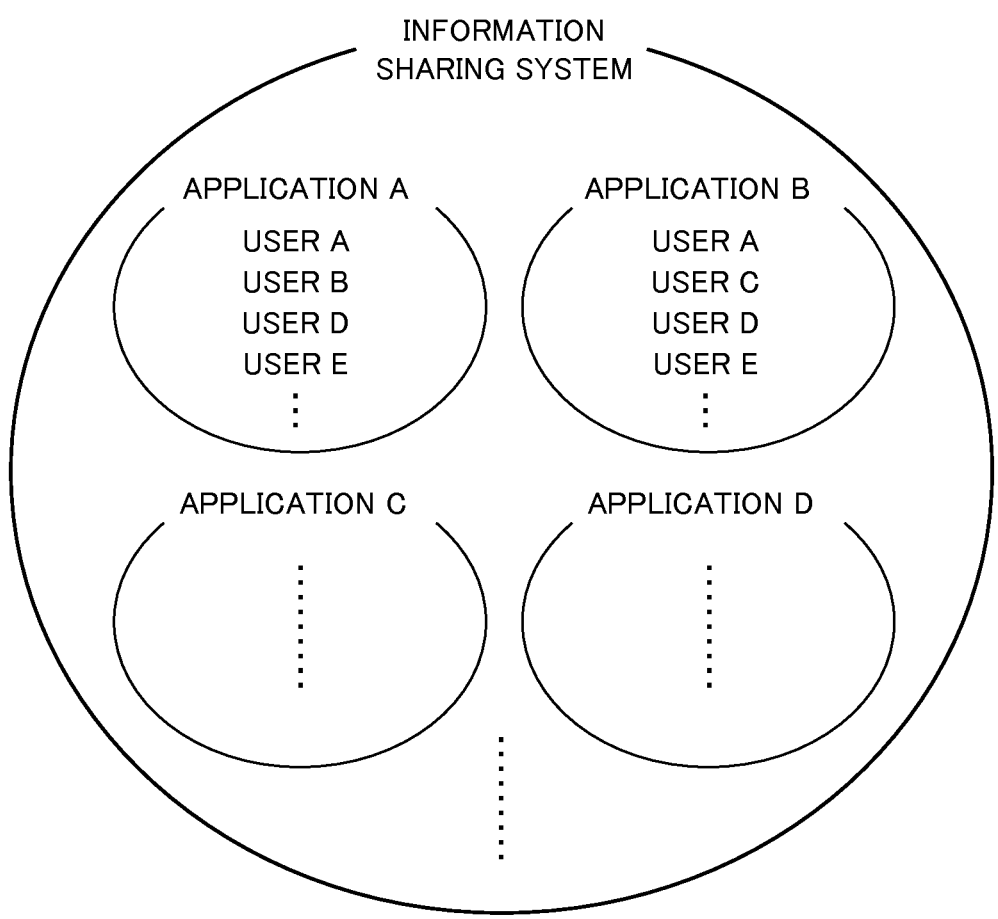
FIG. 2 is a diagram illustrating an example of services provided by the information sharing system.

FIG. 2 illustrates an example of a service provided by the information sharing system 1. As shown in FIG. 2, in the information sharing system 1, there are a plurality of applications available to users. Each application may be prepared by a service provider in advance, or created by each user.

An application is a program for managing information shared between the users. A plurality of users participate in each application. In the following, a user who participates in an application is simply referred to as an application participating user. For example, by an operation of the application participating user, information to be shared is newly posted in the application, or information that is already posted in the application is updated.

Each user can participate (use) at least one of the applications. In the example shown in FIG. 2, "user A" participates in "application A" and "application B". The "user A" can share information posted in the "application A" with other application participating users (e.g., "user B", "user D", and "user E" shown in FIG. 2). On the other hand, a user who is not participating in "application A" (e.g., "user C") generally cannot share information posted in "application A".

As described above, in the information sharing system 1, information is shared among each of the applications. When a user accesses the information sharing server 10, the display unit 24 displays a usage screen for using an application in which the user will participate.

Figure 3:
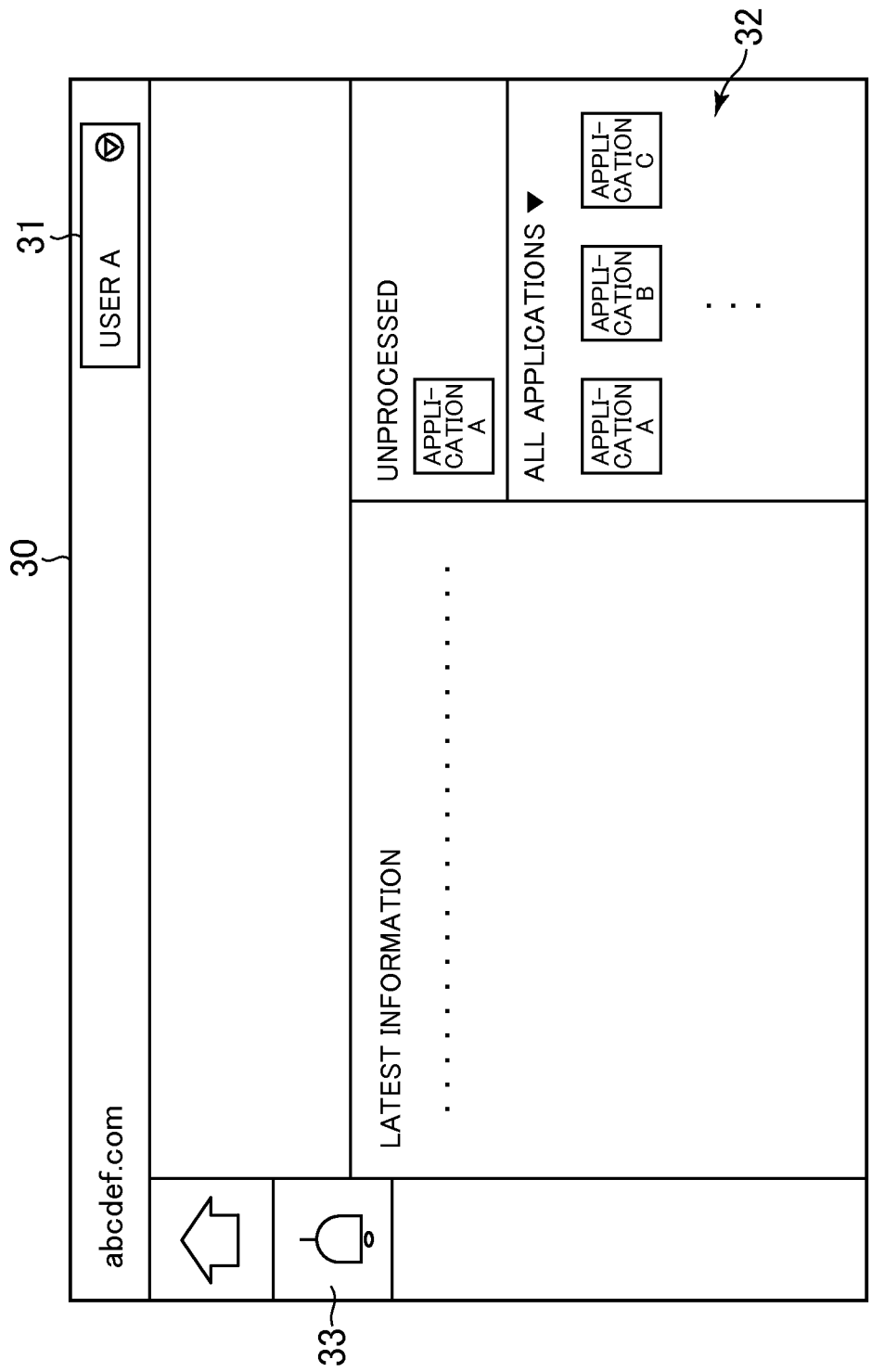
FIG. 3 is a diagram illustrating an example of a usage screen.

FIG. 3 illustrates an example of the usage screen. As shown in FIG. 3, the usage screen 30 displays user identifying information 31 for identifying a user and an application list 32 indicating applications in which the user participates. The user enters their user account and password to perform log-in processing before the usage screen 30 is displayed. That is, suppose that the user identified by the user identifying information 31 has already logged in the information sharing system 1.

The user selects an icon displayed in the application list 32, to thereby use the application corresponding to the icon. In this embodiment, the user can enter a comment to other application participating users. For example, when the user newly posts information by using an application, an input form is displayed on the usage screen 30 so as to enter a comment on the information.

Figure 4:
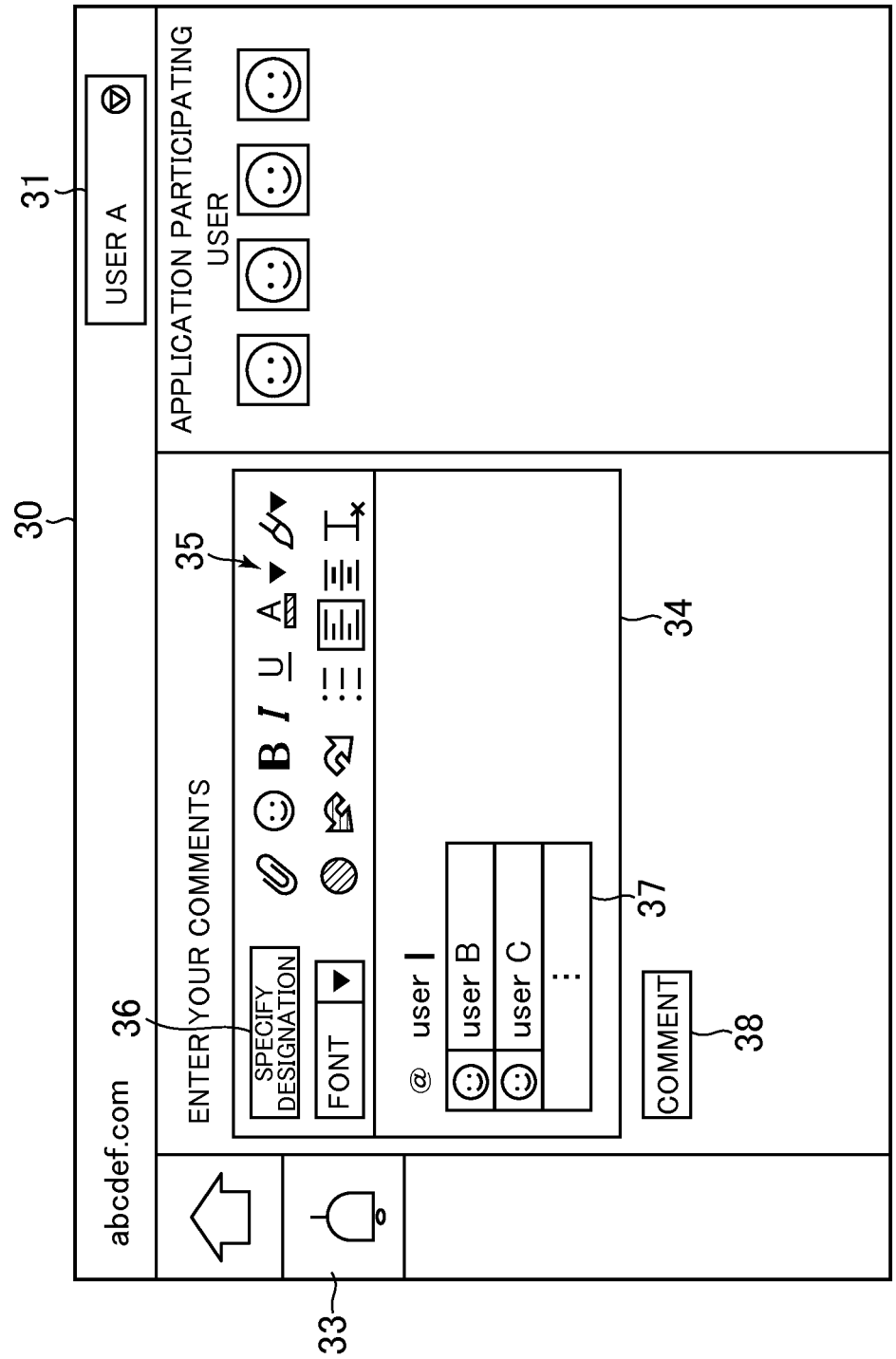
FIG. 4 is a diagram illustrating an example of the usage screen in which an input form is displayed.

FIG. 4 illustrates an example of the usage screen on which an input form is displayed. The user operates the operation unit 25 to enter a comment by moving a cursor to the input form 34. A format of a comment of a user may be changed by selecting, for example, an icon displayed on a format button 35. The comment of the user in the input form 34 can be shared with other application participating users.

In this embodiment, the user can specify a user, to whom the user especially wants to send a comment, among from other application participating users, as a destination of a comment, i.e., the user to talk to. For example, the user inputs a particular symbol (e.g., "@" or ">") in the input form 34 and then inputs a user account of the destination user, thereby specifying the destination of the comment.

The particular symbol may be input directly by the user using e.g., a keyboard of the operation unit 25, or input by selecting a destination button 36. When the user selects the destination button 36, a particular symbol is set in the input form 34.

Here, when the user inputs a particular symbol in the input form 34, a destination list 37 is displayed to show a list of other users. For example, the destination list 37 displays the application participating users of the application in which the user enters a comment. If the user selects at least one of the users in the destination list 37, a user account of the selected application participating user is input to follow the particular symbol.

When the user enters a comment in the input form 34 and selects a comment button 38, the comment is posted in the application. Subsequently, a notification for notifying that the comment is posted will be sent to the other application participating users. Here, a case is described in which the comment is posted at the time when the information is posted. As such, the notification of the comment may be a registration notice of the information to be shared. Each user can display the received notification by selecting a notification button 33 on the usage screen 30.

Figure 5:
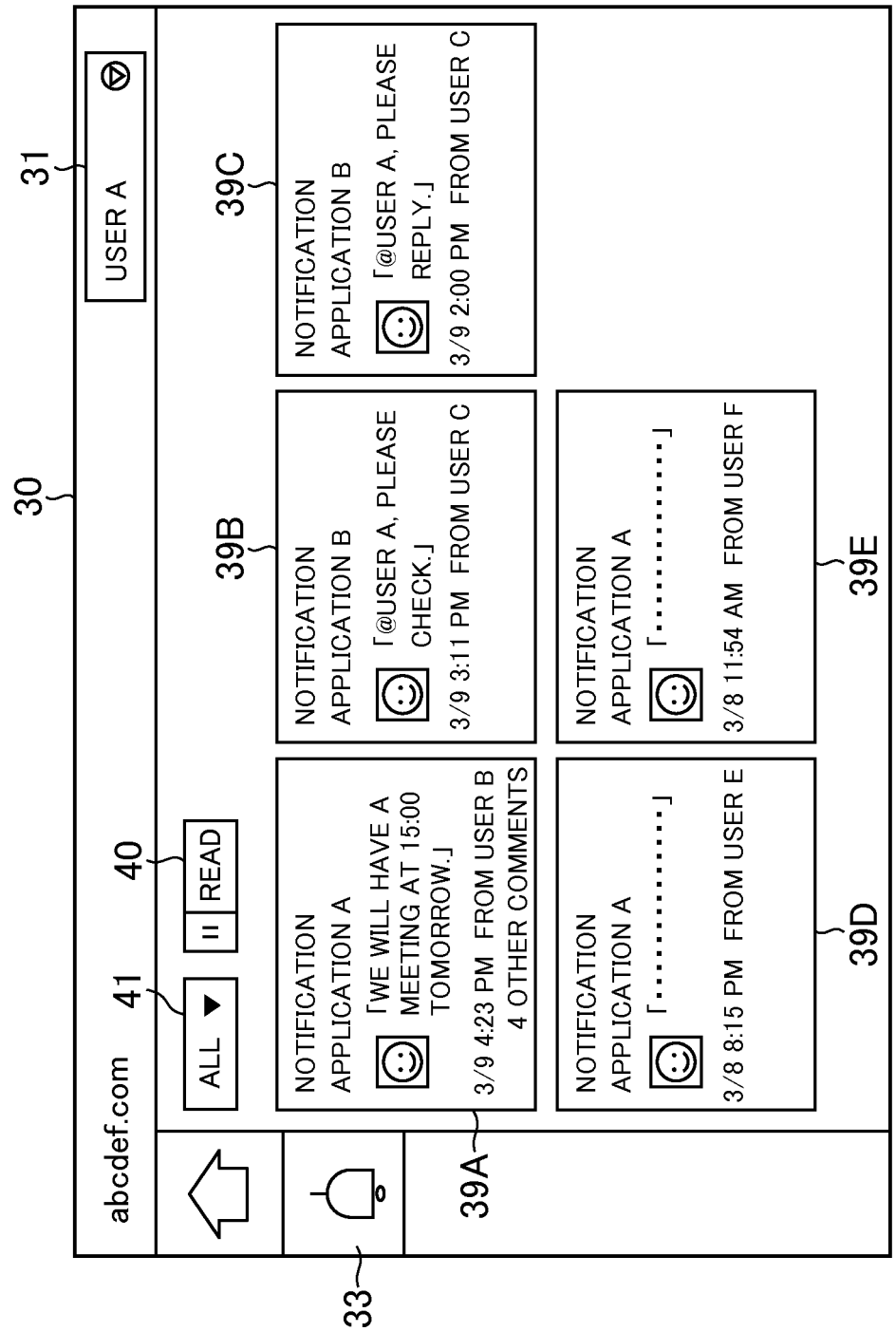
FIG. 5 is a diagram illustrating an example of the usage screen when a notification button is selected.

FIG. 5 illustrates an example of the usage screen 30 when the notification button 33 is selected. As shown in FIG. 5, each user's usage screen 30 displays a notification 39 indicating that other application participating users have posted comments. The example shown in FIG. 5 displays five notifications 39A to 39E. These notifications 39A to 39E are displayed, for example, in forward or reverse chronological order of the comments.

The notification 39 includes information on the user who enters the comment, the application in which the comment is posted, a portion of the comment, and a date and a time when the comment is posted. For example, if the user selects a read/unread button 40, a display mode is switchable between a display mode in which only the notification 39 of unread comment is displayed, and a display mode in which only the notification 39 of read comment is displayed.

As discussed above, each user can specify a destination of a comment to enter, and thus some notifications 39 indicate that the user is specified as the destination of the comments, while others indicate that the user is not specified as the destination of the comments. If the user selects a destination button 41, a display mode is switchable between a display mode in which all notifications 39 are displayed regardless of the destination, and a display mode in which only the notifications 39 of the comments specifying the user as the destination.

Figure 6:
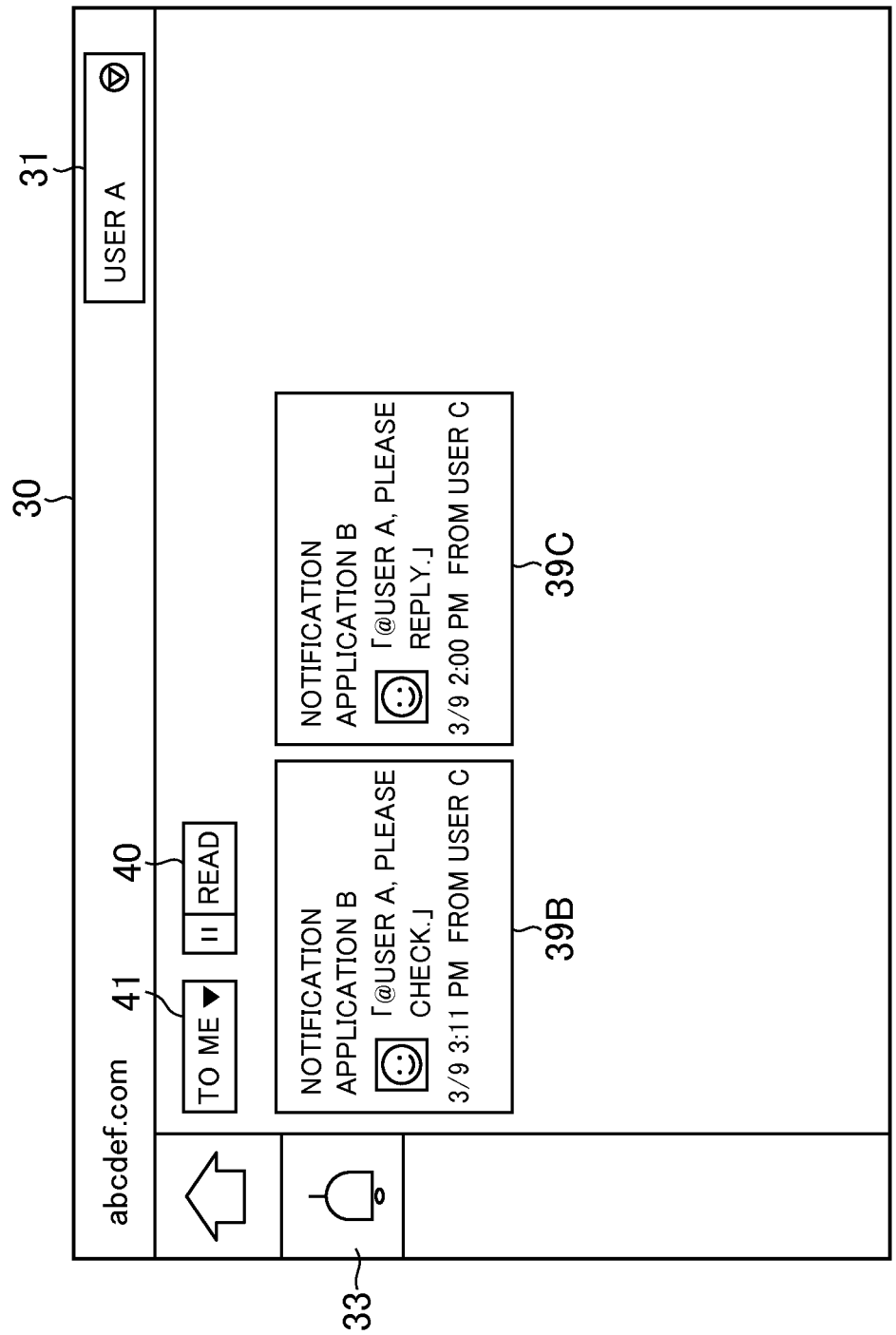
FIG. 6 is a diagram illustrating an example of the usage screen when a user selects a destination button.

FIG. 6 illustrates an example of the usage screen 30 when a user selects the destination button 41. As shown in FIG. 6, if the user sets the destination button 41 for "ME", the notifications 39A, 39D, and 39E of the comments in which the user is not specified as the destination are hided, and only the notifications 39B and 39C of the comments in which the user is specified as the destination are showed. If the user selects one of the notifications 39, the comment indicated by the notification 39 is displayed on the usage screen 30.

Figure 7:
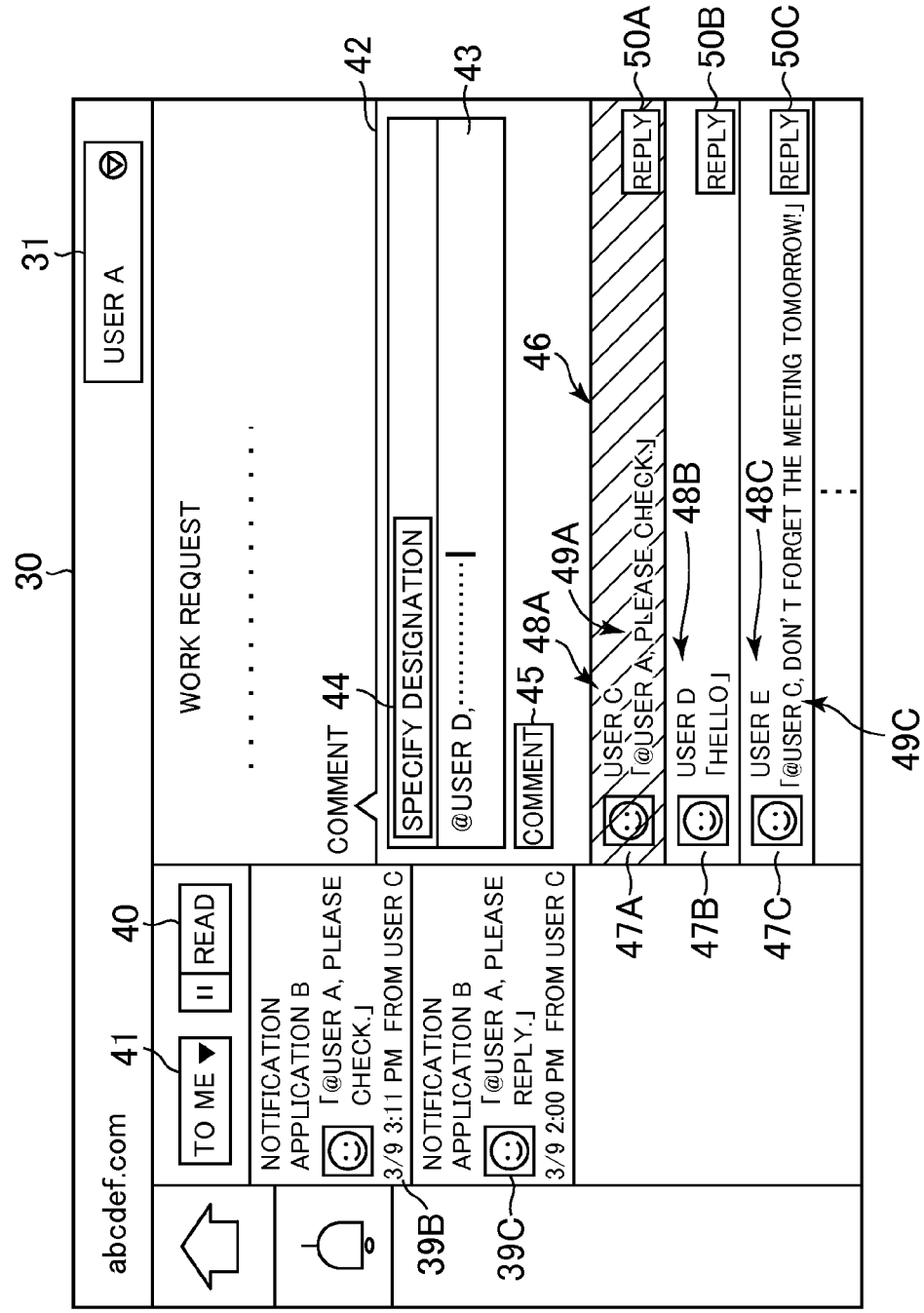
FIG. 7 is a diagram illustrating an example of the usage screen in a case where a user selects a notification.

FIG. 7 illustrates an example of the usage screen 30 when a user selects the notification 39. As shown in FIG. 7, the usage screen 30 displays a comment detail 42 of the comment of the notification 39 selected by the user. The notification 39 is displayed so as to be aligned with the comment detail 42. In this case, if the user selects the read/unread button 40 or the destination button 41, the display of the notification 39 is switched. Further, by selecting the notification 39, it is possible to display the comment detail 42 of the comment of the notification 39.

The comment detail 42 includes an input form 43 in which a user enters a comment. How to enter a comment in the input form 43 by the user is the same as the case with the input form 34 described by referring to FIG. 4. That is, the user selects the destination button 44 or directly inputs a particular symbol in the input form 43, to thereby input the particular symbol in the input form 43. The user enters a user account after the particular symbol, thereby specifying the destination. Further, when the user selects the comment button 45, a notification of the comment is sent to the other application participating users. This process is also the same as the case with the input form 34.

The user enters a comment in the input form 43, thereby replying or giving an opinion on the comment posted by the other application participating users. In the comment detail 42, a comment list 46 of the comments posted by each user is displayed. When the user enters a comment in the input form 43, the posted comment is added to the comment list 46. In this case, the notification 39 to be sent may be a notice for notifying that the comment is added to a comment group (e.g., comments stored in the bulletin board).

In the comment group displayed on the comment list 46, while some comments specify the user as the destination, others do not specify the user as the destination. In this embodiment, the comment that specifies the user as the destination is highlighted relative to other comments that do not specify the user as the destination.

Each of the comments 47 shows a user 48 who has entered the comment 47. Among the comments 47, a comment that specifies the destination shows a destination 49 in a text of the comment 47. For example, in the example shown in FIG. 7, a sender 48A and a destination 49A indicate that "user C" who enters a comment 47A specifies "user A", who displays the usage screen 30, as the destination. On the other hand, a comment 47B does not display a destination 49, which means that "user D" indicated by the sender 48B, enters the comment without specifying the destination. The comment 47C is, as indicated by the sender 48C and the destination 49C, posted by "user E" by specifying "user C" as the destination.

As shown in FIG. 7, a display mode of the comment 47A in which "user A" is specified as the destination and a display mode of the comments 47B and 47C in which "user A" is not specified as the destination are two different. This allows "user A" to easily recognize which comment is addressed to the user A among the comment groups displayed on the comment list 46. In this regard, although the comment 47C specifies the destination, the comment 47C is not highlighted as shown in FIG. 7, since the destination is "user C", not "user A" who displays the usage screen 30.

The user may select a reply button 50 in a comment 47 so as to specify a user who has entered the comment 47 as the destination. When the user selects the reply button 50, a particular symbol and a user account of the user who has entered the comment 47 corresponding to the reply button 50 are entered in the input form 43. For example, when the user selects the reply button 50B, a particular symbol and a user account of "user D" are input in the input form 43 as shown in FIG. 7. In this case, the user inputs, in the input form 43, a reply or a comment to "user D" who has entered the comment 47B, with specifying "user D" as the destination.

As discussed above, the information sharing system 1 in this embodiment provide the feature to allow each user to easily find a comment 47 addressed to the user. In the following, this feature will be discussed in detail.

[3. Functions Implemented in Information Sharing System]

Figures 8, 9:
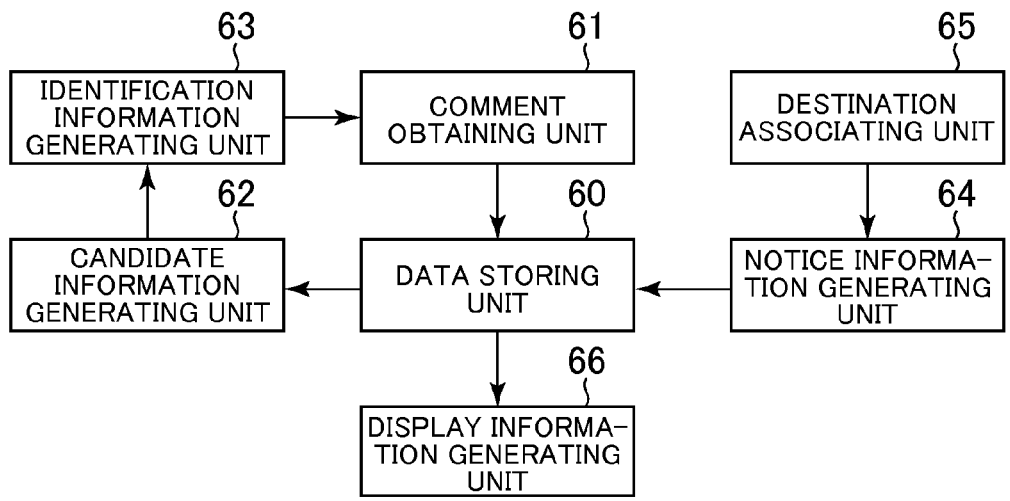
FIG. 8 is a functional block diagram of the information sharing system.
FIG. 9 is a diagram illustrating an example of storing data of comment information.

FIG. 8 shows a functional diagram illustrating the information sharing system 1. As shown in FIG. 8, the information sharing system 1 includes a data storing unit 60, a comment obtaining unit 61, a candidate information generating unit 62, an identification information generating unit 63, a notice information generating unit 64, a destination associating unit 65, and a display information generating unit 66.

This embodiment will explain a case where these units are implemented in the information sharing server 10. In the information sharing server 10, the control unit 11 executes a program stored in the storage unit 12 to implement these units. In the units shown in FIG. 8, the data storing unit 60 is implemented mainly by the storage unit 12, and the other units are implemented mainly by the control unit 11.

[3-1. Data Storing Unit]

The data storing unit 60 stores various types of data required for sharing information among a plurality of users. Regarding the data stored in the data storing unit 60, this embodiment describes user information relating to each user, comment information indicating a comment 47 posted by each user, and notice information for informing each user of a notification 39 of a comment 47.

[User Information]

The user information stores, for example, information for identifying each user (e.g., user account), personal information such as a name or a post of each user, information for identifying an application in which each user participates, setting information by each user (e.g., information indicating selection status of the destination button 41). When the user registers for using the information sharing system 1, a new record is generated in the user information, and information relating to the user who registers is stored. Further, when the user newly participates in an application or edits the user's personal information or setting information, the record of the user is updated.

[Comment Information]

FIG. 9 is a diagram illustrating an example of storing data of comment information. As shown in FIG. 9, the comment information associates and stores information for identifying each comment group (e.g., information for identifying a bulletin board corresponding to a comment group), information for identifying an application (e.g., information for identifying an application with which a bulletin board is made), information for identifying each comment 47 (e.g., information for identifying each of comments on a bulletin board), information for identifying a user who enters a comment 47, and text information for comment 47.

For example, when a reply to a comment is sent, the sent comment is added to the comment information. Further, the comment information may include a date and a time when each comment 47 is posted, or information for identifying a user who initially enters a comment 47 included in a comment group (e.g., user who has created a bulletin board).

[Notice Information]

FIG. 10 is a diagram illustrating an example of storing data of notice information. As shown in FIG. 10, the notice information associates and stores information for identifying a comment group that includes a comment 47 indicated by a notification 39 (i.e., bulletin board in which the comment is posted), information for identifying an application (i.e., application for managing a bulletin board in which a comment is posted), information for identifying the comment 47 indicated by the notification 39, information for identifying a user (sender) who enters a comment 47, information for identifying a user (recipient) to whom notification 39 is sent, a destination identification flag for identifying whether or not the user is the destination, a portion of the posted comment 47, and information on a date and a time. The information on a date and a time may store a date and a time when the processing related to the comment 47 is executed, and may be a date and a time when the notice information is generated, or when the comment information is generated. The user may appropriately select which date and time information should be stored in the notice information.

The destination identification flag takes a value of either "ON" or "OFF". When the destination identification flag is "ON", it suggests that the recipient is the destination, and when the destination identification flag is "OFF", it suggests that the recipient is not the destination.

Examples of information to be stored in the notice information are not limited to those shown in FIG. 10. In addition, for example, the notice information may include a flag indicating whether or not a comment 47 indicated by each notification 39 is displayed on the usage screen 30, or information for identifying a user who initially posts a comment 47 in a comment group (e.g., user who has created a bulletin board).

Examples of data stored in the data storing unit 60 are not limited to those described above. The data storing unit 60 may store data necessary for users to share information. In addition, for example, the data storing unit 60 may store information on the applications used in the information sharing system 1 (e.g., information posted in the applications), or information on a layout of the usage screen 30.

[3-2. Comment Obtaining Unit]

The comment obtaining unit 61 obtains a comment 47 posted by each user. The comment obtaining unit 61 obtains a comment 47 that a user enters into the input forms 34 and 44, and stores the obtained comment in the comment information.

For example, when the comment obtaining unit 61 obtains a comment 47 that a user enters in the input form 34 (e.g., when a bulletin board is newly created), the comment obtaining unit 61 generates a new record in the comment information, and associates and stores information for identifying a comment group, information for identifying an application in which the comment 47 is posted, information for identifying the comment 47, information on a user who has entered the comment 47, and text information on the comment 47.

In addition, for example, when the comment obtaining unit 61 obtains a comment 47 that a user enters in the input form 43 (e.g., when the comment 47 is added to an existing bulletin board), the comment obtaining unit 61 associates and stores information for identifying the user who has entered the comment 47 in the input form 43 and text information on the comment 47, into the corresponding record in the comment information. The corresponding record is a record that stores a comment group displayed on the comment detail 42 (i.e., bulletin board to which the comment 47 is added).

[3-3. Candidate Information Generating Unit]

When a user who enters a comment 47 inputs a particular symbol, the candidate information generating unit 62 generates information for displaying destination candidates of the comment 47 on the display unit 24 corresponding to the user (e.g., image of the destination list 37). The particular symbol may be a predetermined symbol, such as "@" or ">"." In this regard, "the display unit 24 corresponding to the user" means the display unit 24 of the user device 20 operated by the user.

When the user inputs the particular symbol in the input form 34, the candidate information generating unit 62 refers to the user information and obtains the destination candidate. In this embodiment, the candidate information generating unit 62 generates an image of the destination list 37, which includes the other application participating users in the application in which the comment 47 is posted, as the destination candidate.

[3-4. Identification Information Generating Unit]

The identification information generating unit 63 generates information (e.g., user account of each user included in the destination list 37) for setting (inputting) information (e.g., user account), which is used for identifying the destination candidate selected by the user who enters the comment 47, to a position corresponding to the particular symbol. For example, the identification information generating unit 63 refers to the user information, and obtains a user account of the application participating user included in the destination list 37.

"Position corresponding to the particular symbol" is a position that is determined based on the particular symbol, such as a position immediately before or after the particular symbol. The identification information generating unit 63 may input the user accounts with the particular symbol between. In this case, the positions immediately before and after the particular symbol are the positions corresponding to the particular symbol.

[3-5. Notice Information Generating Unit]

When one of the plurality of the users enters a comment 47, the notice information generating unit 64 generates notice information for informing other users of a notification 39 of the comment 47. In this embodiment, the notice information generating unit 64 generates pieces of notice information as many as the number of the users to whom the notification 39 is to be sent, and stores the generated information in the data storing unit 60.

For example, when a user enters a comment 47, the notice information generating unit 64 refers to the user information to specify the application participating user to whom the notification 39 of the comment 47 is to be sent. Subsequently, the notice information generating unit 64 generates new records in the notice information as many as the number of the specified application participating users. The notice information generating unit 64 stores, in the newly generated records, information for identifying a comment group in which the comment 47 is posted, an application in which the comment 47 is posted, information for identifying the posted comment 47, a sender who enters the comment 47, the specified application participating user (recipient), a portion of the comment 47, and the date and time. Here, a destination identification flag of the record is set by a destination associating unit 65 described below.

[3-6. Destination Associating Unit]

When the user who enters a comment 47 specifies the destination of the comment 47, the destination associating unit 65 associates destination identifying information (e.g., destination identification flag) for identifying the specified designation with the notice information. In this regard, "associates destination identifying information with the notice information" suggests including the destination identifying information in the notice information, and associating the destination identifying information with the notice information to store them in the data storing unit 60.

In this embodiment, when the user who enters the comment 47 inputs a particular symbol in the comment 47, the destination associating unit 65 obtains the destination identifying information based on content that is input on the portion in the comment 47 corresponding to the particular symbol. That is, the destination associating unit 65 specifies the destination based on a symbol string (e.g., user account of the application participating user) that is input on the position corresponding to the particular symbol.

The destination associating unit 65 sets a value of the destination identification flag of the record, which is generated by the notice information generating unit 64 and corresponds to the specified destination, as "ON". Here, a value of the destination identification flag of the record, which is generated by the notice information generating unit 64 and corresponds to the user who is not the destination, is set as "OFF".

[3-7. Display Information Generating Unit]

The display information generating unit 66 generates display information (e.g., HTML data of the usage screen 30) for displaying, on a display unit 24 of a user, a screen to distinguish the notification 39 of the comment 47 that specifies the user as the destination from the notification 39 of the comment 47 that does not specify the user as the destination, based on the notice information and the destination identifying information.

In this embodiment, the display information generating unit 66 generates display information (e.g., HTML data of the usage screen 30 as shown in FIG. 5) for displaying, on a display unit 24 of a user, a screen including both of the notification 39 of the comment 47 that specifies the user as the destination and the notification 39 of the comment 47 that does not specify the user as the destination. That is, in this case, the display information generating unit 66 generates HTML data of the usage screen 30 including the both of the notifications 39 without distinguishing them.

When the user performs a predetermined operation (e.g., select a destination button 41), the display information generating unit 66 generates display information (e.g., HTML data of the usage screen 30 shown in FIG. 6) for displaying a screen on which the notification 39 of the comment 47 that does not specify the user as the destination is restricted (prohibited) from being displayed.

In this embodiment, when the notification 39 of the comment group including the comment 47 that specifies a user as the destination is selected on a display unit 24 corresponding to the user, the display information generating unit 66 generates display information (e.g., HTML data of the usage screen 30 shown in FIG. 7) for displaying a screen on which the comment 47 that specifies the user as the destination is distinguished from the comment 47 that does not specify the user as the destination.

For example, changing a display mode of the comment 47 corresponds to distinguishing the comments 47. For example, the display information generating unit 66 executes predetermined image processing on the comment 47 (e.g., changing colors of background or characters, design, and brightness), and thereby generating display information for displaying a screen on which the comments 47 are distinguished one another.

In the comment list 46 of the usage screen 30, distinguishing the comments 47 may be performed such that only the comments 47 that specify the user as the destination are displayed, and the comments 47 that do not specify the user as the destination are not be displayed. In this case, only the comment 47 with the destination identification flag being "ON" is to be displayed in the comment list 46.

[4. Processing Executed in Information Sharing System]

In the following, processing executed in the information sharing system will be described. Here, comment posting processing for each user to enter a comment 47 and notification display processing to display a notification 39 received by each user will be described.

Such processing is implemented by the control unit 11 executing a program stored in the storage unit 12, and by the control unit 21 executing a program stored in the storage unit 22. In the following, when the processing is executed, suppose that the user has already performed log-in processing. Further, when the user device 20 sends information to the information sharing server 10, suppose that the user device 20 sends, for example, information and an IP address for identifying the user.

[Comment Posting Processing]

Figure 11:
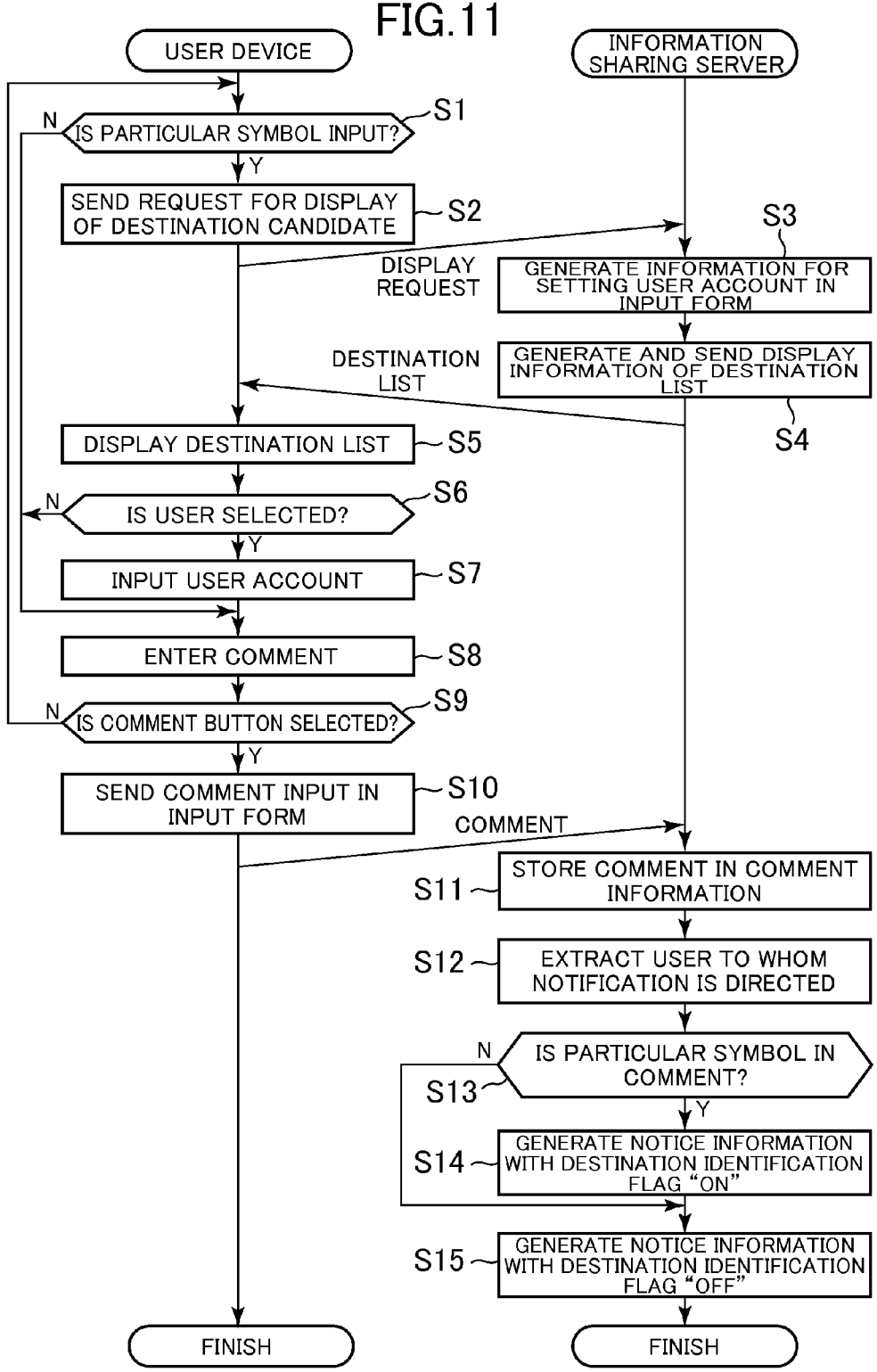
FIG. 11 is a diagram illustrating an example of comment posting processing.

FIG. 11 is a diagram illustrating an example of the comment posting processing. When the comment posting processing described below is executed, suppose that the application in which the user posts the comment 47 is specified, and the usage screen 30 shown in FIG. 4 is displayed on the display unit 24. Further, suppose that the storage unit 12 temporarily retains information for identifying the application specified by the user.

As shown in FIG. 11, the control unit 21 determines whether or not a particular symbol is input in the input form 34 (S1). In S1, based on a detected signal of the operation unit 25, the control unit 21 determines whether or not the particular symbol is directly input in the input form 34, or whether or not the particular symbol is input in the input form 34 by selecting the destination button 36.

If it is determined that the particular symbol is input in the input form 34 (S1;Y), the control unit 21 sends a request for displaying the destination candidate to the information sharing server 10 (S2).

When the information sharing server 10 receives the request for displaying the destination candidate, the control unit 11 refers to the user information and generates information for setting the user account of the application participating user in the input form 34 (S3). In S3, the control unit 11 obtains the user account of the application participating user from the user information.

The control unit 11 generates display information of the destination list 37 and sends the generated display information to the user device 20 (S4). This display information includes the user account obtained in S3.

When the user device 20 receives the display information, the control unit 21 displays the destination list 37 on the usage screen 30 (S5). The control unit 21 determines whether or not the user displayed in the destination list 37 is selected (S6). In S6, based on the operation of the operation unit 25, the control unit 21 determines which of the application participating users displayed in the destination list 37 is specified.

If it is determined that the user displayed in the destination list 37 is selected (S6;Y), the control unit 21 inputs the user account of the selected user into the input form 34 (S7). In S7, the control unit 21 inputs the user account of the destination candidate user that the user has selected from destination list 37 immediately after the particular symbol.

The control unit 21 enters a comment 47 in the input form 34 based on the detected signal of the operation unit 25 (S8). It is also possible for the user to specify the destination by directly inputting a user account of another user in the input form 34 without selecting the destination list 37.

The control unit 21 determines whether or not the comment button 38 is selected (S9). If it is not determined that the comment button 38 is selected (S9;N), the processing returns to S1, and continues to accept input of a comment 47 by the user.

If it is determined that the comment button 38 is selected (S9; Y), the control unit 21 sends the comment 47 that is input in the input form 34 to the information sharing server 10 (S10).

When the information sharing server 10 receives the comment 47, the control unit 11 stores the received comment 47 in the comment information (S11). In S11, the control unit 11 generates a new record in the comment information, and associates and stores, in the record, information for identifying the comment group (e.g., bulletin board), the application in which the comment 47 is posted, information for identifying the comment 47, the user who enters the comment 47, and text information of the comment 47.

The control unit 11 refers to the user information and extracts a user to whom the notification 39 of the comment 47 is directed (S12). In S12, the control unit 11 obtains the application participating user of the application in which the user posts the comment 47.

The control unit 11 determines whether or not the comment 47 posted by the user includes a particular symbol (S13). If it is determined that the particular symbol is included (S13;Y), the control unit 11 extracts a user account of the user who is input in the position corresponding to the particular symbol, and generates notice information with the destination identification flag being "ON" (S14).

In S14, the control unit 11 generates a new record in the notice information, and associates and stores information for identifying the comment group (bulletin board), the application in which the comment 47 is posted, information for identifying the comment 47, the user who enters the comment 47, the extracted user account (i.e., user account of the destination), destination identification flag being "ON", the excerpt of the comment 47 (e.g., predetermined number of the first characters), and the current date and time.

The control unit 11 generates notice information with the destination identification flag being "OFF" (S15), and the comment posting processing is finished.

In S15, the control unit 11 generates a new record in the notice information, and associates and stores information for identifying the comment group (bulletin board), the application in which the comment 47 is posted, information for identifying the comment 47, the user who enters the comment 47, the user account of the application participating user (i.e., user account of the user who is not specified as the destination), the destination identification flag being "OFF", the excerpt of the comment 47 (e.g., predetermined number of the first characters), and the current date and time. If the processing in S14 is executed before the processing in S15 is executed, notice information is to be generated for the users other than the user whose notice information is generated in S14.

[Notification Display Processing]

Figure 12:
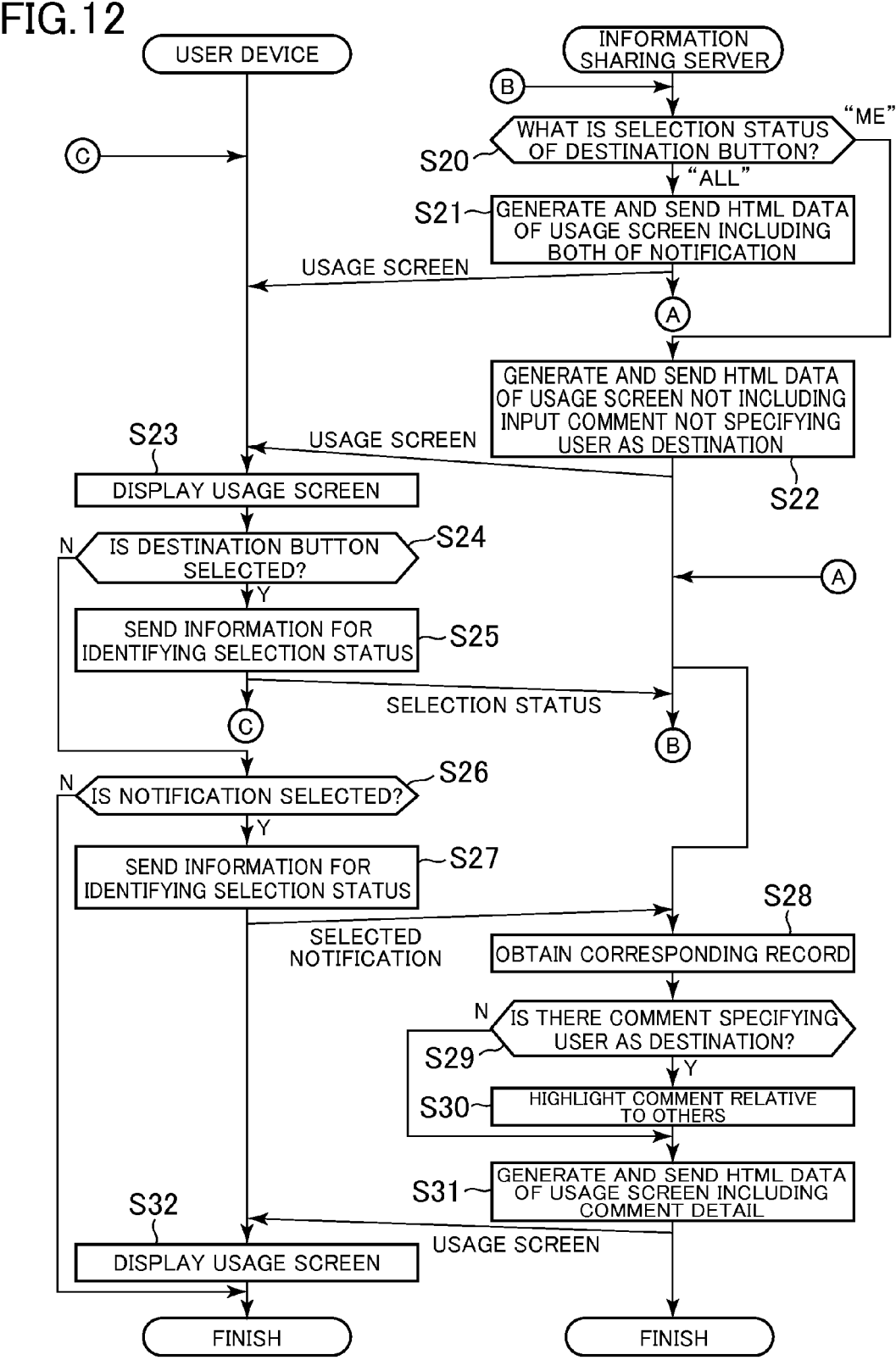
FIG. 12 is a diagram illustrating an example of notification display processing.

FIG. 12 is a diagram illustrating an example of the notification display processing. The notification display processing is executed, for example, when the notification button 33 is selected. As shown in FIG. 12, the control unit 11 checks a selection status of the destination button 41 in the usage screen 30 (S20). In S20, the control unit 11 refers to the user information, and specifies the selection status of the destination button 41 set by the user.

If the selection status of the destination button 41 is "ALL" (S20; "ALL"), the control unit 11 generates and sends HTML data of the usage screen 30 that includes both of the notification 39 of the comment 47 that specifies the user as the destination and the notification 39 of the comment 47 that does not specify the user as the destination (S21). In S21, the control unit 11 extracts, from the notice information, the record in which the user who displays the usage screen 30 is a recipient, and, as shown in FIG. 5, generates and sends HTML data of the usage screen 30 in which the both of the notifications are not distinguished.

On the other hand, if the selection status of the destination button 41 is "ME" (S20; "ME"), the control unit 11 generates and sends HTML data of the usage screen 30 that includes only the notification 39 of the comment 47 that specifies the user as the destination (S22). In S22, the control unit 11 extracts, from the notice information, the record in which the user who displays the usage screen 30 is a recipient and the destination identification flag is "ON", and, as shown in FIG. 6, generates and sends HTML data of the usage screen 30 that does not include the notification 39 of the comment 47 that does not specify the user as the destination.

When the user device 20 receives the HTML data, the control unit 21 displays the usage screen 30 (S23). The control unit 21 determines whether or not the destination button 41 is selected (S24). If it is determined that the destination button 41 is selected (S24;Y), the control unit 21 sends information for identifying the selection status of the destination button 41 to the information sharing server 10 (S25).

When the information sharing server 10 receives information for identifying the selection status of the destination button 41, the processing of S20 is executed again. In this case, the processing of S21 or S22 is executed according to the destination button 41 selected by the user, thereby switching the notifications 39 to be displayed on the usage screen 30.

On the other hand, if it is determined that the destination button 41 is not selected (S24;N), the control unit 21 determines whether or not the notification 39 displayed on the usage screen 30 is selected (S26). If it is determined that the notification 39 is selected (S26;Y), the control unit 21 sends information for identifying the selected notification 39 to the information sharing server 10 (S27).

When the information sharing server 10 receives the information for identifying the selected notification 39, the control unit 11 refers to the comment information, and obtains a record corresponding to the notification 39 selected by the user (S28). In S28, the control unit 11 obtains a record of the comment group including the comments 47, of which the user selects the notification 39, from the records stored in the comment information.

The control unit 11 determines whether or not there is a comment 47, in the comments 47 included in the record obtained in S28, that specifies the user who has selected the notification 39 as the destination (S29). In S29, the control unit 11 determines whether or not each comment 47 includes a particular symbol. If a particular symbol is included, it is determined whether or not the user account input after the particular symbol is the user who has selected the notification 39.

If it is determined that there is a comment 47 that specifies the user as the destination (S29;Y), the control unit 11 highlights the comment 47 relative to the other comments 47 (S30), and generates and sends HTML data of the usage screen 30 including the comment detail 42 (S31). In S30, for example, the control unit 11 sets a color of the background of the comment 47 that specifies the user as the destination as the predetermined color that is different from the color of the background of other comments 47.

On the other hand, if it is determined that there is no comment 47 that specifies the user as the destination (S29; Y), the control unit 11 does not execute the processing in S30, and executes processing in S31. In this case, the control unit 11 generates HTML data of the usage screen 30 including the comment detail 42 in which no comment 47 is highlighted.

When the user device 20 receives the HTML data, the control unit 21 displays the usage screen 30 on the display unit 24 (S32), and the processing is finished.

When the user enters a comment in the input form 43 of the comment detail 42 after the usage screen 30 is displayed in S32, the processing similar to the comment posting processing shown in FIG. 11 is executed. In this regard, the comment entered into the input form 43 is a reply or a comment to the comment 47 that is already posted by another user, and thus the comment is added to the record already prepared in the comment information.

According to the information sharing system 1 described above, it is possible to distinguish the notification 39 of the comment 47 that specifies the user who displays the usage screen 30 as the destination from the notification 39 of the comment 47 that does not specify the user as the destination, and thus the user can easily find the comment 47 directed to the user.

The comment detail 42 displays, in the comment group, the comment 47 that specifies the user as the destination in distinction from the comment 47 that does not specify the user as the destination, and thus the user can readily recognize which comment 47 is directed to the user in the comment group.

Further, the user can specify the destination in the comment 47 by inputting a particular symbol in the comment 47 and then specifying the user account. When the user inputs the particular symbol, the user can easily specify the destination by displaying the destination list 37.

[5. Variations]

The present invention is not to be limited to the above described embodiment and can be changed as appropriate without departing from the spirit of the invention.

Figure 13:
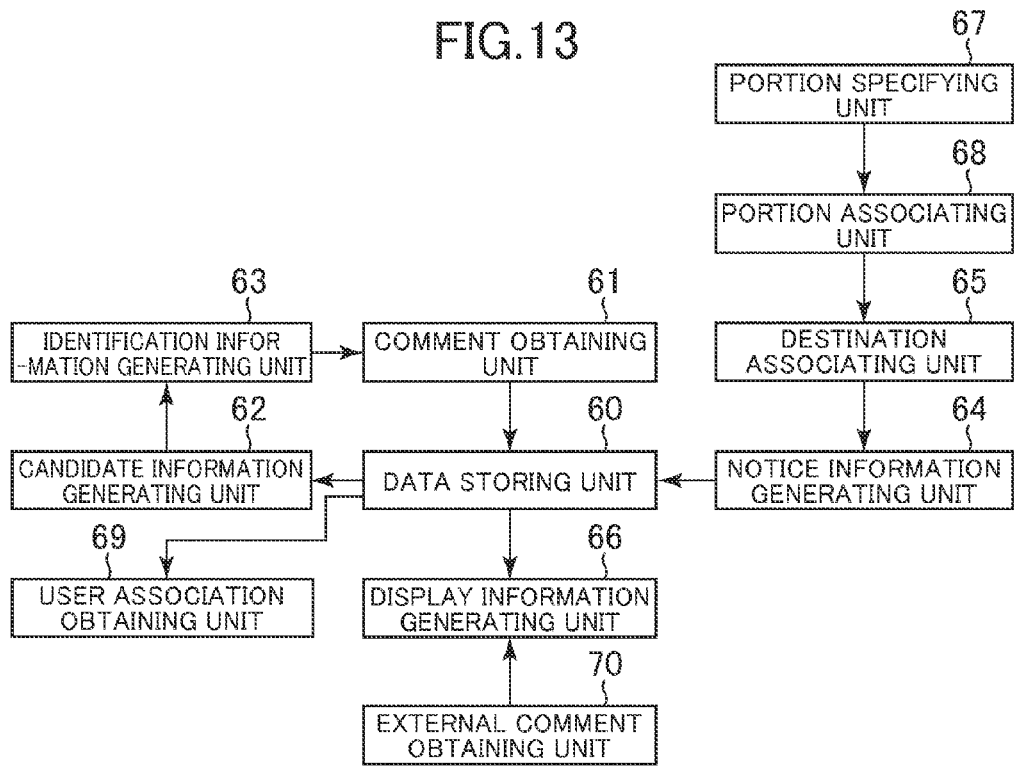
FIG. 13 is a functional block diagram in one variant.

FIG. 13 is a functional block diagram in one variant. As shown in FIG. 13, in the variations described below, a portion specifying unit 67, a portion associating unit 68, a user association obtaining unit 69, and an external comment obtaining unit 70 are implemented in addition to the functions described in the embodiment. In the following, a case will be described where these functions are implemented mainly by the control unit 11.

(1) For example, the embodiment describes excerpting a predetermined number of the first characters of the comment 47 and displaying the excerpt in the notification 39, although only the portion of the comment 47 that closely relates to the destination may be excerpted to be displayed on the notification 39.

The information sharing system 1 of the variation (1) includes the portion specifying unit 67 and the portion associating unit 68. When the user who enters a comment 47 inputs a particular symbol (e.g., "@" and ">") in the comment 47, the portion specifying unit 67 specifies the portion of the comment with which the user specifies the destination based on the position of the particular symbol.

Figure 14:
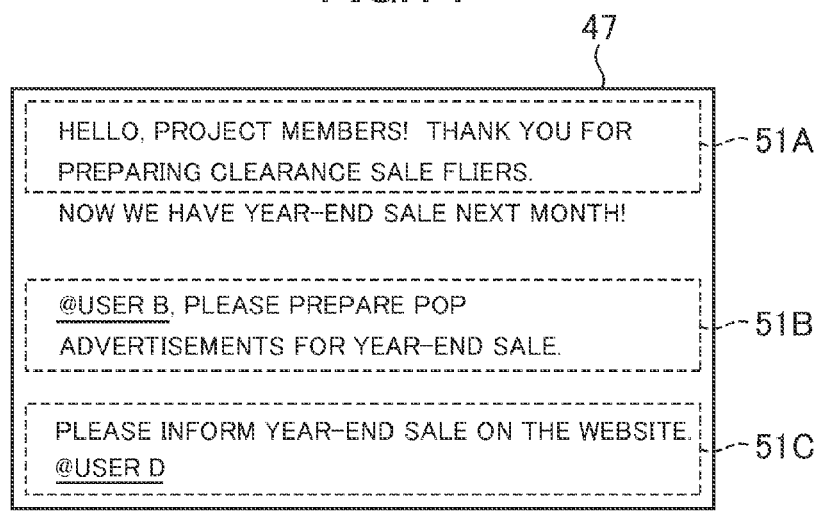
FIG. 14 is a diagram illustrating an example how a portion of a comment is specified.

FIG. 14 is a diagram illustrating an example how the portion of the comment is specified. For example, in the embodiment, the portion of the comment 51A at the start of the comment 47 shown in FIG. 14 is extracted and displayed on the notification 39. In this variation, the portions that specify the destination in the comment 47 are extracted as the portion of the comments 51B and 49C.

The comment 47 shown in FIG. 14 specifies a plurality of destinations. For example, in the comment 47, the portion around the account of "user B" is a comment directed to "user B", and the portion around the account of "user C" is a comment directed to "user C". As shown in FIG. 14, a portion to specify the destination is not necessarily placed preceding the comment, but may be placed after the comment.

In this case, the portion specifying unit 67 specifies the portion of the comments 51 per a plurality of destinations. For example, the portion specifying unit 67 extracts the portion of the comment 51B around the account of "user B" who is the destination. Further, the portion specifying unit 67 extracts the portion of the comment 51C around the account of "user D" who is the destination. In this way, the portion specifying unit 67 specifies the portion of the comment 51 in the comment 47, which is determined based on the position of the particular symbol or the user account.

The portion associating unit 68 associates portion identifying information for identifying the specified portion of the comment with the destination identifying information. The portion associating unit 68 extracts the portion of the comment specified by the portion specifying unit 67, and stores the extracted portion of the comment in the notice information.

For example, the portion associating unit 68 stores the portion of the comment 51 around the destination in the notice information with the destination identification flag being "ON". In the example of FIG. 14, the portion associating unit 68 stores the portion of the comment 51B in the notice information corresponding to "user B", and stores the portion of the comment 51C in the notice information corresponding to "user C". In the notice information with the destination identification flag being "OFF", the portion of the comment 51A at the start of the comment may be stored, or the portion of the comment 51B or the portion of the comment 51C may be stored.

When the display information generating unit 66 of the variation (1) displays the notification 39 of the comment 47, which specifies a user as the destination, on the display unit 24 of the user, the display information generating unit 66 generates display information (e.g., HTML data of the usage screen 30) for displaying the portion of the comment of the comment 47 on the screen including the notification 39, based on the portion identifying information.

The display information generating unit 66 displays, in the notification 39, the portion of the comment of the comment 47 around the user account of the destination. For example, in the example shown in FIG. 14, the portion of the comment 51B is displayed in the notification 39 received by "user B", and the portion of the comment 51C is displayed in the notification 39 received by "user C". In other words, the display information generating unit 66 differentiates the portion of the comment to be displayed in the notification 39 according to the destination.

According to the variation (1), it is possible to extract the portion necessary for the user in the comment 47, in which the user is specified as the destination, and displays the extracted portion in the notification 39.

(2) For example, as described in the embodiment, in a case where the user group to which the notification 39 of the comment is directed (e.g., other application participating users to which the notification 39 is to be sent) is set in advance, the users other than this user group (e.g., users other than the application participating users) may be specified as the destination. For example, although the user is a user who does not participate in the application in which the comment 47 is posted, the user may be specified as the destination if the content of the comment 47 is desired to be shared.

When the destination specified in the posted comment 47 includes the user who does not belong to a user group (e.g., group of a plurality of application participating users) set in advance, the notice information generating unit 64 of the variation (2) generates notice information for informing the user, who does not belong to the user group, of the notification. Here, the method for generating notice information and setting destination identification flag is the same as described in the embodiment, however the notice information generating unit 64 generates notice information not only for the application participating user but also for the user other than the application participating user.

That is, in S12 of FIG. 11 as explained in the embodiment, the application participating user is extracted as a user to whom the notification is directed, while in variation (2), the application participating user and the users other than the application participating user (i.e., the destination specified by the sender) are extracted as the user to whom the notification is directed. For example, the notice information generating unit 64 extracts the users other than the application participating user based on the content posted by the sender (e.g., user account included in the comment 47). Subsequently, the notice information generating unit 64 generates notice information for informing the extracted users of the notification 39.

The display information generating unit 66 of this variation generates display information (e.g., HTML data of the usage screen 30) for displaying, on a display unit 24 of a user, the notification 39 of the comment 47 in which the user is specified as the destination, among the comments 47 of the user group to which the user does not belong (e.g., the application in which the user is not participating). How to generate the usage screen 30 is the same as described in the embodiment. In this variation, when the application participating user of the application, in which a user is not participating, specifies the user as the destination and enters a comment 47, the user receives the notification 39 of such comment. When the notification 39 is selected, the comment 47 is displayed on the usage screen 30.

According to the variation (2), it is possible to specify the users other than the application participating user as the destination. As such, for example, when one of the users wishes to exceptionally share a specific comment 47 with a user other than the application participating user, the comment 47 can be shared by specifying the user as the destination.

In the embodiment and variations described above, each application sets access right, and only the application participating user can view the information in general. As such, when a user having no access right is specified as the destination, the user may be restricted to only view the notification 39, but not permitted to view the comment 47 itself.

Further, for example, when a user having no access right is specified as the destination, notice information may be generated such that the notification 39 is not directed to the user. In this case, an alarm message may be displayed on the usage screen 30 when the comment 47 is posted. Further, after the alarm message is displayed, whether or not to generate notice information for sending the notification 39 to the user having no access right may be determined based on an operation of the user who enters the comment 47.

(3) The information sharing system 1 may obtain, for example, a comment 47 posted in an external system. For example, when a user uses both of the information sharing system 1 and the external system, the user has user accounts for respective systems. As such, the information sharing system 1 may obtain a comment 47 directed to the user and posted from the external system, and display the notification 39 of the comment 47 in the information sharing system 1.

Figure 15:
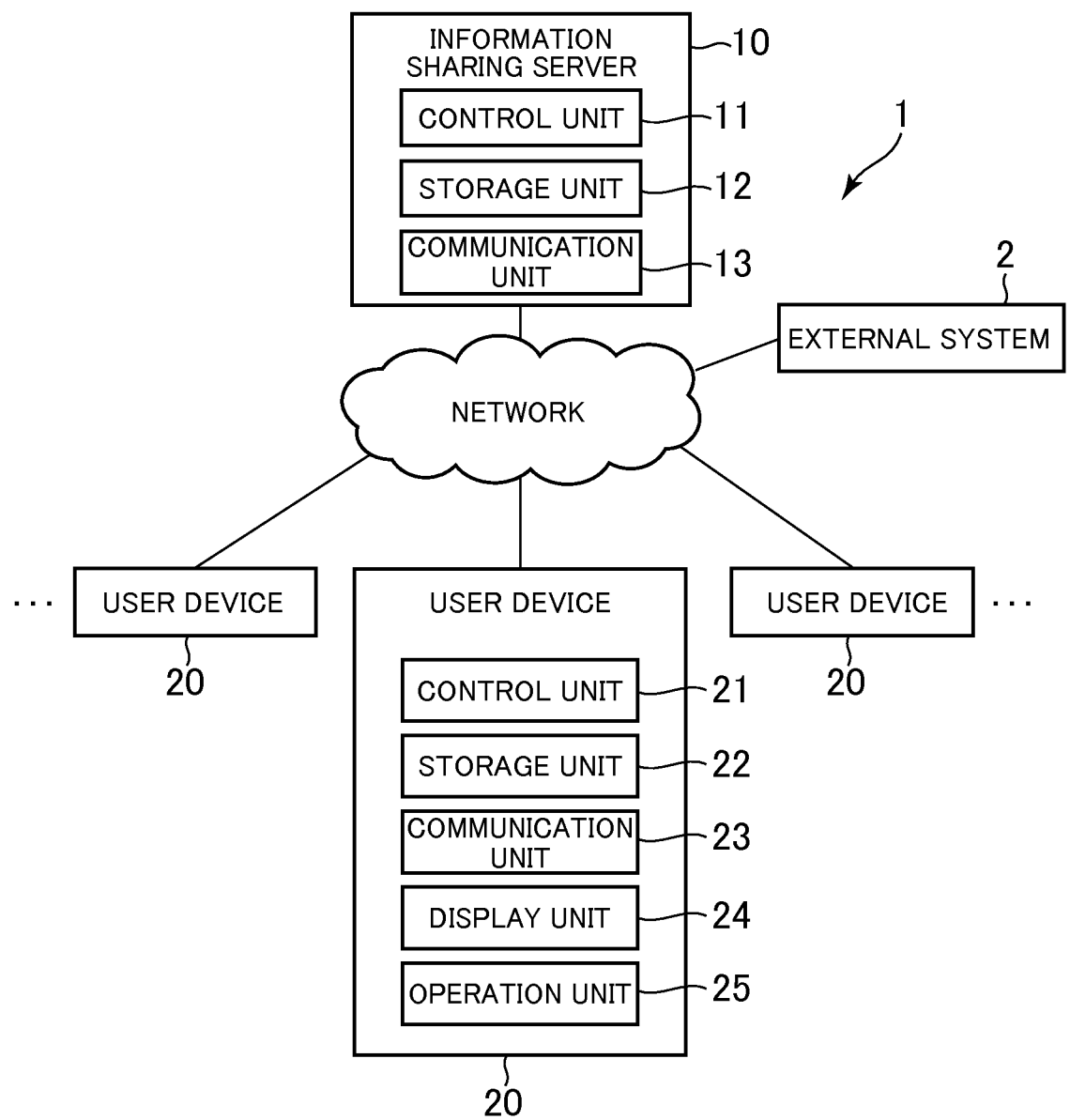
FIG. 15 is a diagram illustrating the system configuration of variation (3).

FIG. 15 is a diagram illustrating the system configuration of variation (3). As shown in FIG. 15, the information sharing system 1 is network-connected with an external system 2 in which information is shared between a plurality of users. The external system 2 may implement the same functional block as the information sharing system 1. That is, in the external system 2, each user who uses the external system 2 enters a comment 47 by specifying the destination. The comment can be shared between the users.

The information sharing system 1 of this variation includes a user association obtaining unit 69 and an external comment obtaining unit 70. The user association obtaining unit 69 obtains content stored in a means (e.g., data storing unit 60) for storing each user of the information sharing system 1 in association with each user of the external system 2. For example, suppose that a table indicating a corresponding relationship between information for identifying each user of the information sharing system 1 and information for identifying each user of the external system is stored in the data storing unit 60. Such table may be editable by the operation of service providers or users.

The external comment obtaining unit 70 obtains, from the external system, information for notifying each user of the information sharing system 1 of the comment 47 posted from the external system 2 (e.g., comment 47 posted in the external system 2) and information for identifying a user of the external system 2 who is specified as the destination of the comment 47 (e.g., information for identifying a user of the external system 2). For example, when the destination is specified in a comment 47 also in the external system 2, the external comment obtaining unit 70 obtains text information the comment 47 posted in the external system 2.

The display information generating unit 66 generates display information for displaying, on a display unit 24 of a user of the information sharing system 1, a screen on which the notification 39 of the comment 47 of the external system 2 that specifies a user of the external system 2 associated with the user as the destination is distinguished from the notification 39 of the comment 47 of the external system 2 that does not specify a user of the external system 2 associated with the user as the destination.

For example, the display information generating unit 66 refers to the table obtained by the user association obtaining unit 69, and specifies the user of the information sharing system 1 who is associated with the destination specified in the external system 2. Subsequently, the display information generating unit 66 displays the usage screen 30, on which the notifications 39 are distinguished one another, on the display unit 24 of the specified user. How to generate the usage screen 30 on which the notifications 39 are distinguished one another is the same as described in the embodiment. In addition, the notice information generating unit 64 generates notice information for each of the specified users. Such procedure is also the same as described in the embodiment.

According to the variation (3), the notification 39 of the comment 47 posted in the external system 2 can be displayed in the information sharing system 1. For example, when a user uses both of the information sharing system 1 and the external system 2, the user can display the notifications 39 of the comments 47 posted in the external system 2 in distinction from one another depending on whether or not the user is specified as the destination in the comment.

(4) For example, not only a single user but also a group of a plurality of users (e.g., user group for each position or division of a company) may be specified as the destination of a comment 47. In the above embodiment and variations, "destination" may be replaced with "destination user or destination group". For example, when a user sets the destination button 41 as "ME", only the notification 39 of the comment 47 directed to the destination group to which the user belongs may be displayed on the usage screen 30.

In this case, suppose that, in the data storing unit 60, information on each of the plurality of groups is stored and information for identifying each group and users who belong to each group are defined. Information on each group is updated based on the operation of users. That is, when a user joins or leaves a group, information on the group is updated.

How to specify a destination group by each user is the same as how to specify a destination user by each user. That is, information for identifying the destination group (e.g., account of a user group) may be input immediately after the particular symbol. Further, how the destination associating unit 65 associates a destination group with notice information and how the display information generating unit 66 generates HTML data of the usage screen 30 are the same as described in the embodiment. For example, when displaying the usage screen 30, the display information generating unit 66 determines whether or not the user belongs to the destination group.

For example, the user who enters the comment 47 may specify the application as the destination. That is, "destination group" may be a group of all of the application participating users. In this case, the user inputs information for identifying an application as the destination immediately after the particular symbol. When the user specifies an application as the destination group, all of the application participating users of the application become the destination.

For example, when a user is newly added to a group, the notice information generating unit 64 may specify the comment 47 posted by the user of the group (or a comment 47 specifying the group as the destination group), and generate information for informing the newly added user of the notification 39 of the comment 47. The notification 39 is presented to the user newly added to the group based on the generated notice information, and the comment 47 can be displayed for the newly added user on the usage screen 30. That is, the user newly added to the group can view the notification 39 and the comment 47 as if the user has been belonging to the group. In this case, the notice information generating unit 64 may generate notice information for the comments 47 over the whole period in the past, or for certain periods in the past. Further, such period may be changeable according to the operation of users.

Similarly, when a user newly participates in an application, the notice information generating unit 64 may specify the comment 47 posted by the application participating user of the application (or a comment 47 specifying the application as the destination group), and generate notice information for informing the newly added user of the notification 39 of the comment 47. In this case also, the user who has newly participated in the application can view the notification 39 and the comment 47 as with the original application participating users. In this regard, a period for generating notice information is the same as mentioned above.

The above example explains the case where the destination button 41 is selected to switch displays in order to distinguish the notification 39 specifying the user as the destination and the notification 39 not specifying the user as the destination. However, how to distinguish the notifications 39 is not limited to the above example. These notifications 39 may be distinguished on the usage screen 30. In addition, for example, a display mode of the notification 39 specifying the user as the destination may be differentiated from a display mode of the notification 39 not specifying the user as the destination.

The above example explains the case where only the application participating user can view information managed by the application, although other users may view the information. That is, when a comment 47 is posted, a user other than the application participating users does not receive the notification 39 in general, but may view the comment 47 itself. Further, it can be switched whether information managed in the application is shared only among the application participating users or viewed by other users by the operation of the application participating user.

The above example explains the case where notice information is generated for each user to whom the notification 39 is to be sent, although one piece of notice information may be generated for each comment 47. Further, in the above, it is described that the destination is specified in the comment 47, although the destination may be specified in other ways. For example, an input form to specify the destination may be prepared in addition to the input form in which a comment 47 is entered.

For example, users displayed on the destination list 37 may be extracted according to content entered by the user. For example, only the users who have a user account that matches a character string input by the user may be displayed on the destination list 37. Further, users displayed on the destination list 37 may be the users who are often specified by each user as the destination, or the users who are set by each user in advance. In this case, for example, history information of destinations specified by each user in the past (e.g., history information is updated when a user specifies the destination) is stored in the data storing unit 60, and a user to be displayed on the destination list 37 is determined based on the history information. Further, for example, information indicating a user to be displayed on the destination list 37 (e.g., this information is updated by an operation of each user) is stored in the data storing unit 60 for each user, and the destination list 37 is displayed based on the information.

For example, a user may specify a filter condition of notifications 39 in the usage screen 30. For example, the user may specify a user who posts the comment 47, or an application in which the comment 47 is posted. In this case, among the notifications 39 received by the user, only the notification 39 that matches a condition specified by the user is displayed on the usage screen 30.

For example, when a user enters a comment 47, the user may designate a task to be performed by other application participating users. In this case, the user enters a comment 47 relating to the task. The notification 39 may include a task to be performed by each user. When a user selects a notification 39 that includes a task to do, buttons etc. are displayed on the usage screen 30 to be used for performing the task.

The comment posted by the user may include information other than text information. For example, the user may post a comment including a pictograph, an image, or a motion picture. Various known techniques are applicable to the method for posting an image or a motion picture in a comment. In this case, an image data of each user (e.g., user's face photograph) may be stored in user information, and the destination may be specified using the image data. That is, how to specify the destination is not limited to the way to specify the user account as described in the embodiment, but the destination may be specified by designating an image data associated with the other users. Each user may specify the destination by designating information for identifying the users.

For example, the embodiment explains the case where notice information of the user specified as the destination is generated in S14, and then notice information of the user not specified as the destination is generated in S15. However, the notice information generating unit 64 may generate notice information of all of the users to whom the notification 39 is directed, and subsequently set the destination identification flag of the record corresponding to the user specified as the destination as "ON", and the destination identification flag of the record corresponding to the user not specified as the destination as "OFF".

Regarding the functions of the information sharing system 1 described above, essential functions are the notice information generating unit 64, the destination associating unit 65, and the display information generating unit 66. The other functions may be omitted.

For example, in the above, the information sharing system 1 includes a plurality of computers, although a single computer may implement the information sharing system 1. In this case, the computer that implements the information sharing system 1 may obtain a comment or a destination from an external computer connected to the computer, or send HTML data of the usage screen 30 to the external computer.

The invention claimed is:

1. An information sharing system for sharing information among a user group including a first user and a second user, comprising at least one central processor configured to:
    send a message from each user of the user group to all other users of the user group;
    send to the first user a first type notification which is separated from the message in a case where the message includes a comment that specifies the first user as a destination and sending to the second user a second type notification which is different from the first type notification and is separated from the message;
    send to the second user the first type notification which is separated from the message in a case where the message includes a comment that specifies the second user as a destination and sending to the first user the second type notification which is separated from the message;
    send to the first user and the second user the second type notification which is separated from the message in a case where the destination is not specified in the message; and
    generate display information for displaying a screen on a display of each of the first user and the second user, the screen distinguishing the first type notification from the second type notification.

2. The information sharing system according to claim 1, wherein the at least one central processor generates display information for displaying, on the display, a screen that includes both the first type notification and the second type notification, and generates, when a predetermine operation is performed, the display information for displaying a screen on which the second type notification is restricted from being displayed.

3. The information sharing system according to claim 1, wherein the information sharing system allows the user group to share a comment group that includes comments,
    wherein the first type notification and the second type notification are information for informing that a comment is added to the comment group,
    wherein the at least one central processor generates, in a case where the first type notification is selected, display information for displaying a screen distinguishing, in the comment group, a comment that specifies the first user or the second user as the destination from a comment that does not specify the first user or the second user as the destination.

4. The information sharing system according to claim 1, wherein the at least one central processor identifies the destination, in a case where a particular symbol in the comment is inputted, based on content posted in a portion of the comment corresponding to the particular symbol.

5. The information sharing system according to claim 4, wherein the at least one central processor
    generates, in a case where the particular symbol is inputted, information for displaying a destination candidate of the comment on a display; and
    generates setting information, which is for identifying the destination candidate selected on the portion corresponding to the particular symbol.

6. The information sharing system according to claim 4, wherein the at least one central processor:
    specifies, in a case where the particular symbol is inputted in the comment, a portion of the comment in which specifies a destination of the comment based on a position of the particular symbol; and
    generates display information for displaying a screen that includes the specified portion of the comment in the first type notification.

7. The information sharing system according to claim 1, wherein the at least one central processor executes processing for sending the first type notification, in a case where a destination specified in the comment includes a user who does not belong to the user group, to the specified user who does not belong to the user group.

8. The information sharing system according to claim 1, wherein the information sharing system is connected via a network to an external system for sharing information among a plurality of users,
    wherein the at least one central processor:
    obtains content stored in an association unit that associates and stores respective users of the information sharing system and respective users of the external system;
    obtains, from the external system, information for informing the users of the information sharing system of a comment posted in the external system and information for identifying a user, of the external system, who is specified as a destination of the comment, and
    generates display information for displaying, on the display, a screen distinguishing a first type notification and a second type notification of a comment that is posted in the external system.

9. An information sharing method for sharing information among a user group including first user and a second user, comprising:

sending a message from each computer of each user of the user group to all other users' computers of the user group;

sending to the first user's computer, a first type notification which is separated from the message in a case where the message includes a comment that specifies the first user as a destination and sending to the second user a second type notification which is different from the first type notification and is separated from the message;

sending to the second user's computer, the first type notification which is separated from the message in a case where the message includes a comment that specifies the second user as a destination and sending to the first user the second type notification which is separated from the message;

sending to the first user's computer and the second user's computer the second type notification which is separated from the message in a case where the destination is not specified in the message;

generating display information for displaying a screen on a display of each of the first user's computer and the second user's computer, the screen distinguishing the first type notification from the second type notification.

10. A computer-readable non-transitory information storage medium storing a program for causing a computer, which shares information among a user group including a first user and a second user, to perform the functions of:

sending a message from each user of the user group to all other users of the user group;

sending to the first user a first type notification which is separated from the message in a case where the message includes a comment that specifies the first user as a destination and sending to the second user a second type notification which is different from the first type notification and is separated from the message;

sending to the second user the first type notification which is separated from the message in a case where the message includes a comment that specifies the second user as a destination and sending to the first user the second type notification which is separated from the message; executing fourth processing for sending to the first user and the second user the second type notification which is separated from the message in a case where the destination is not specified in the message; and generating display information for displaying a screen on a display of each of the first user and the second user, the screen distinguishing the first type notification from the second type notification.

11. The information sharing system according to claim 1, further comprising a storage.

12. The information sharing system according to claim 11, further comprising:

a network card which is in communication with the at least one central processor and the storage.

13. The information sharing system according to claim 1, wherein at least one central processor executes processing for sending to the first user the first type notification which is separated from the message, in a case where the message includes a first comment portion that specifies the first user as the destination and a second comment portion that is not specified the destination, and sending to the second user the second type notification which is separated from the message.

14. The information sharing system according to claim 13, wherein at least one central processor generates display information for displaying not only the first comment portion but also the second comment portion when the first user selects the first type notification.

15. The information sharing system according to claim 1, wherein at least one central processor switches between a screen that includes only the first type notification and a screen that includes both of the first type notification and the second type notification.

* * * * *